US012720444B2

(12) United States Patent
Hsu et al.

(10) Patent No.: US 12,720,444 B2
(45) Date of Patent: Aug. 25, 2026

(54) METHOD FOR PERFORMING TRANSMISSION AND RECEPTION CONTROL OF WIRELESS COMMUNICATIONS DEVICE WITH COMMUNICATIONS CONTROL CIRCUITS CORRESPONDING TO DIFFERENT TYPES OF COMMUNICATIONS SERVICES, AND ASSOCIATED WIRELESS COMMUNICATIONS DEVICE

(71) Applicant: MEDIATEK INC., Hsin-Chu (TW)

(72) Inventors: Chang-Yi Hsu, Hsinchu City (TW); Yu-Ming Wen, Hsinchu City (TW); Po-Hsun Huang, Hsinchu City (TW); Li-Tien Chang, Hsinchu City (TW); Chia-Ming Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 290 days.

(21) Appl. No.: 18/398,183

(22) Filed: Dec. 28, 2023

(65) Prior Publication Data

US 2024/0292342 A1 Aug. 29, 2024

Related U.S. Application Data

(60) Provisional application No. 63/486,673, filed on Feb. 24, 2023.

(51) Int. Cl.

*H04W 52/36* (2009.01)
*H04W 52/06* (2009.01)
*H04W 52/28* (2009.01)

(52) U.S. Cl.

CPC .......... *H04W 52/36* (2013.01); *H04W 52/06* (2013.01); *H04W 52/286* (2013.01)

(58) Field of Classification Search

CPC ... H04W 52/36; H04W 52/06; H04W 52/286; H04W 52/243

(Continued)

(56) References Cited

U.S. PATENT DOCUMENTS 9,107,172 B1 8/2015 Epstein
2008/0069062 A1* 3/2008 Li .................... H04W 52/383 370/338

(Continued)

*Primary Examiner* — Don N Vo
(74) *Attorney, Agent, or Firm* — Winston Hsu

(57) ABSTRACT

A wireless communications device and a method for performing transmission and reception control of wireless communications device are provided. The method may include: utilizing a first communications control circuit to determine at least one indication regarding the first communications control circuit, for being sent to a second communications control circuit; utilizing the second communications control circuit to receive the at least one indication from the first communications control circuit, for indicating at least one behavior of the first communications control circuit; and utilizing the second communications control circuit to determine transmission power of the second communications control circuit at least according to whether multiple conditions (e.g., at least one condition dependent on the at least one indication) related to the first communications control circuit are met, for controlling respective transmission power levels of multiple packets from the second communications control circuit to a second communications device in a per-packet manner.

19 Claims, 14 Drawing Sheets

(58) Field of Classification Search
USPC .......................................................... 455/522
See application file for complete search history.

(56) References Cited

U.S. PATENT DOCUMENTS

| | | | | |
|---|---|---|---|---|
| 2008/0261645 | A1* | 10/2008 | Luo | H04W 52/362 455/67.11 |
| 2016/0330756 | A1 | 11/2016 | Sun | |
| 2023/0027625 | A1* | 1/2023 | Jeon | H04W 52/38 |
| 2023/0060811 | A1* | 3/2023 | Byk | H04W 52/246 |
| 2024/0064808 | A1* | 2/2024 | Kang | H04W 74/0816 |

* cited by examiner 100
110
Wireless communications device
111
Communications control circuit
112
Communications control circuit
101
Wireless communications device
102
Wireless communications device

| BT/WF Case | bt_rx_rw | bt_tx_active | bt_rx_active | bt_find_acc_code | WF TX power level control |
|---|---|---|---|---|---|
| WF/WF Case | | wf_tx_active | wf_rx_active | wf_rx_decode | |
| ZB/WF Case | | zb_tx_active | zb_rx_active | zb_rx_info_vld | |
| BT1/WF Case | bt1_rx_rw | bt1_tx_active | bt1_rx_active | bt1_rx_decode | |
| WF1/WF Case | | | wf1_rx_active | wf1_rx_decode | |
| 0: default | --/0 | --/0 | --/0 | --/0 | High (CR0) |
| 1 | --/0 | 1 | 0 | 0 | Normal (CR1) |
| 2 | --/0 | 0 | 1 | 0 | FDD (CR2) |
| 0 : if Max > CR0<br>3 : if CR3 ≥ Exp<br>4 : if Exp > CR3 | --/0 | 0 | 1 | 1 | Max<br>{WF_TX_Power_min (CR3),<br>Expected_WF_TX_power (Exp) + TX_delta} |
| 6 | > 0 & > PKT_Duration | -- | -- | -- | Normal (CR6) |
| 7 | > 0 & < PKT_Duration | -- | -- | -- | FDD (CR7) |

Channel spacing →

| Channel spacing | | | ≤ 5 MHz | > 5 MHz ≤ 10 MHz | > 10 MHz ≤ 15 MHz | > 15 MHz ≤ 20 MHz | > 20 MHz ≤ 25 MHz | > 25 MHz ≤ 30 MHz | > 30 MHz ≤ 35 MHz | > 35 MHz ≤ 40 MHz | > 40 MHz |
|---|---|---|---|---|---|---|---|---|---|---|---|
| | | | c0 | c1 | c2 | c3 | c4 | c5 | c6 | c7 | c8 |
| WF TX power in BT ANT | ≤ -35 dBm | r0 | UHG (7) | UHG (7) | UHG (7) | UHG (7) | UHG (7) | UHG (7) | UHG (7) | UHG (7) | UHG (7) |
| | > -35 dBm ≤ -30 dBm | r1 | HG (6) | HG (6) | HG (6) | HG (6) | HG (6) | UHG (7) | UHG (7) | UHG (7) | UHG (7) |
| | > -30 dBm ≤ -25 dBm | r2 | HG (6) | HG (6) | HG (6) | HG (6) | HG (6) | HG (6) | UHG (7) | UHG (7) | UHG (7) |
| | > -25 dBm ≤ -20 dBm | r3 | MHG (5) | MHG (5) | MHG (5) | MHG (5) | MHG (5) | MHG (5) | HG (6) | HG (6) | HG (6) |
| | > -20 dBm ≤ -15 dBm | r4 | MG (4) | MG (4) | MG (4) | MG (4) | MG (4) | MHG (5) | MHG (5) | MHG (5) | MHG (5) |
| | > -15 dBm ≤ -10 dBm | r5 | LG (3) | LG (3) | LG (3) | LG (3) | MG (4) | MG (4) | MG (4) | MG (4) | MHG (5) |
| | > -10 dBm ≤ -5 dBm | r6 | LG (3) | LG (3) | LG (3) | LG (3) | LG (3) | LG (3) | MG (4) | MG (4) | MG (4) |
| | > -5 dBm ≤ 0 dBm | r7 | LG (3) | LG (3) | LG (3) | LG (3) | LG (3) | LG (3) | LG (3) | MG (4) | MG (4) |
| | > 0 dBm | r8 | ULG (2) | LG (3) | LG (3) | LG (3) | LG (3) | LG (3) | LG (3) | LG (3) | MG (4) |

↓ WF TX power in BT ANT

FIG. 12

METHOD FOR PERFORMING TRANSMISSION AND RECEPTION CONTROL OF WIRELESS COMMUNICATIONS DEVICE WITH COMMUNICATIONS CONTROL CIRCUITS CORRESPONDING TO DIFFERENT TYPES OF COMMUNICATIONS SERVICES, AND ASSOCIATED WIRELESS COMMUNICATIONS DEVICE

CROSS REFERENCE TO RELATED APPLICATIONS

This application claims the benefit of U.S. Provisional Application No. 63/486,673, filed on Feb. 24, 2023. The content of the application is incorporated herein by reference.

BACKGROUND

The present invention is related to communications control, and more particularly, to a method for performing transmission and reception control of a wireless communications device with communications control circuits corresponding to different types of communications services, and the associated wireless communications device such as a station (STA) device.

According to the related art, a wireless communications device may be designed to provide a Wi-Fi communications service and a Bluetooth communications service, for example, by using the same radio frequency band such as the 2.4 gigahertz (GHz) band. When a user of the wireless communications device have some activities related to the Wi-Fi and the Bluetooth communications services at the same time, one or more problems such as interference may occur. Although the wireless communications device may be designed to provide the Wi-Fi communications service by using another radio frequency band such as the 5 GHz band, the wireless communications device may need to provide the Wi-Fi communications service by using the 2.4 GHz band in certain situations. For example, the wireless communications device may switch from the 5 GHz band to the 2.4 GHz band in order to make the receiving (Rx) sensitivity be sufficient for the case of long distance. Some suggestions may be proposed to try solving the problems, but further problems such as some side effects may be introduced. Thus, a novel method and associated architecture are needed for solving the problems without introducing any side effect or in a way that is less likely to introduce a side effect.

SUMMARY

It is an objective of the present invention to provide a method for performing transmission and reception control of a wireless communications device, and the associated wireless communications device such as a STA device, in order to solve the above-mentioned problem.

At least one embodiment of the present invention provides a method for performing transmission and reception control of a wireless communications device, where the wireless communications device may comprise a first communications control circuit and a second communications control circuit. For example, the first communications control circuit may communicate with a first communications device in compliance with a first protocol to provide a first wireless communications service, and the second communications control circuit may communicate with a second communications device in compliance with a second protocol to provide a second wireless communications service. The method may comprise: utilizing the first communications control circuit to determine at least one indication regarding the first communications control circuit, for being sent to the second communications control circuit; utilizing the second communications control circuit to receive the at least one indication from the first communications control circuit, for indicating at least one behavior of the first communications control circuit; and utilizing the second communications control circuit to determine transmission power of the second communications control circuit at least according to whether multiple conditions related to the first communications control circuit are met, for controlling respective transmission power levels of multiple packets from the second communications control circuit to the second communications device in a per-packet manner, wherein the multiple conditions comprise at least one condition which is dependent on the at least one indication. According to some embodiments, the method may further comprise: utilizing the first communications control circuit to determine a reception gain of the first communications control circuit according to respective behaviors of the first communications control circuit and the second communications control circuit, for preventing occurrence of any saturation of a first received signal that is received from the first communications device by the first communications control circuit, wherein the reception gain is dependent on the transmission power of the second communications control circuit. For example, the wireless communications device may determine a channel spacing indication, for indicating a channel spacing between a second wireless communications channel of the second communications control circuit and a first wireless communications channel of the first communications control circuit. In addition, the first communications control circuit may determine a received signal strength of a second received signal that is previously received from the second communications control circuit by the first communications control circuit through at least one first antenna coupled to the first communications control circuit. Additionally, the first communications control circuit may select a predetermined candidate reception gain from multiple predetermined candidate reception gains according to the received signal strength of the second received signal and the channel spacing indication to be the reception gain of the first communications control circuit.

At least one embodiment of the present invention provides a wireless communications device, where the wireless communications device may comprise a first communications control circuit and a second communications control circuit. For example, the first communications control circuit may be arranged to communicate with a first communications device in compliance with a first protocol to provide a first wireless communications service, wherein the first communications control circuit determines at least one indication regarding the first communications control circuit, for being sent to at least one other circuit within the wireless communications device. In addition, the second communications control circuit may be arranged to communicate with a second communications device in compliance with a second protocol to provide a second wireless communications service, wherein the second communications control circuit receives the at least one indication from the first communications control circuit, for indicating at least one behavior of the first communications control circuit. Additionally, the second communications control circuit may determine transmission power of the second communications control circuit at least according to whether multiple conditions related to the first communications control circuit are met, for controlling respective transmission power levels of multiple packets from the second communications control circuit to the second communications device in a per-packet manner, wherein the multiple conditions comprise at least one condition which is dependent on the at least one indication. According to some embodiments, the first communications control circuit may be arranged to determine a reception gain of the first communications control circuit according to respective behaviors of the first communications control circuit and the second communications control circuit, for preventing occurrence of any saturation of a first received signal that is received from the first communications device by the first communications control circuit, wherein the reception gain is dependent on the transmission power of the second communications control circuit. For example, the wireless communications device may be arranged to determine a channel spacing indication, for indicating a channel spacing between a second wireless communications channel of the second communications control circuit and a first wireless communications channel of the first communications control circuit; the first communications control circuit may be arranged to determine a received signal strength of a second received signal that is previously received from the second communications control circuit by the first communications control circuit through at least one first antenna coupled to the first communications control circuit; and the first communications control circuit may be arranged to select a predetermined candidate reception gain from multiple predetermined candidate reception gains according to the received signal strength of the second received signal and the channel spacing indication to be the reception gain of the first communications control circuit.

It is an advantage of the present invention that, through proper design, the present invention method and the associated apparatus such as the wireless communications device can adaptively control the transmission power of the second communications control circuit (e.g., a Wi-Fi control circuit) and the reception gain of the first communications control circuit (e.g., a Bluetooth control circuit). For example, when it is detected that the time of a Wi-Fi transmitting (Tx) operation and the time of a Bluetooth receiving (Rx) operation will overlap each other, the present invention method and the associated apparatus can dynamically decrease the transmission power (e.g., the Wi-Fi Tx power) of the second communications control circuit, rather than aborting transmission (e.g., the Wi-Fi Tx operation) directly for preventing the first communications control circuit from being affected by the second communications control circuit, in order to enhance a receiving throughput of the second communications control circuit. In addition, when it is detected that the time of the Bluetooth Rx operation and the time of the Wi-Fi Tx operation will overlap each other, the present invention method and the associated apparatus can dynamically decrease the reception gain (e.g., the Bluetooth Rx gain) of the first communications control circuit, in order to mitigate an Rx saturation issue, and more particularly, preventing occurrence of any saturation of a signal that is received from the first communications device by the first communications control circuit. Additionally, the present invention method and the associated apparatus can solve the problems of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 illustrates an adaptive Tx power control scheme of a method for performing transmission and reception control of a wireless communications device according to an embodiment of the present invention.

FIG. 12 illustrates an adaptive Rx gain control scheme of the method according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
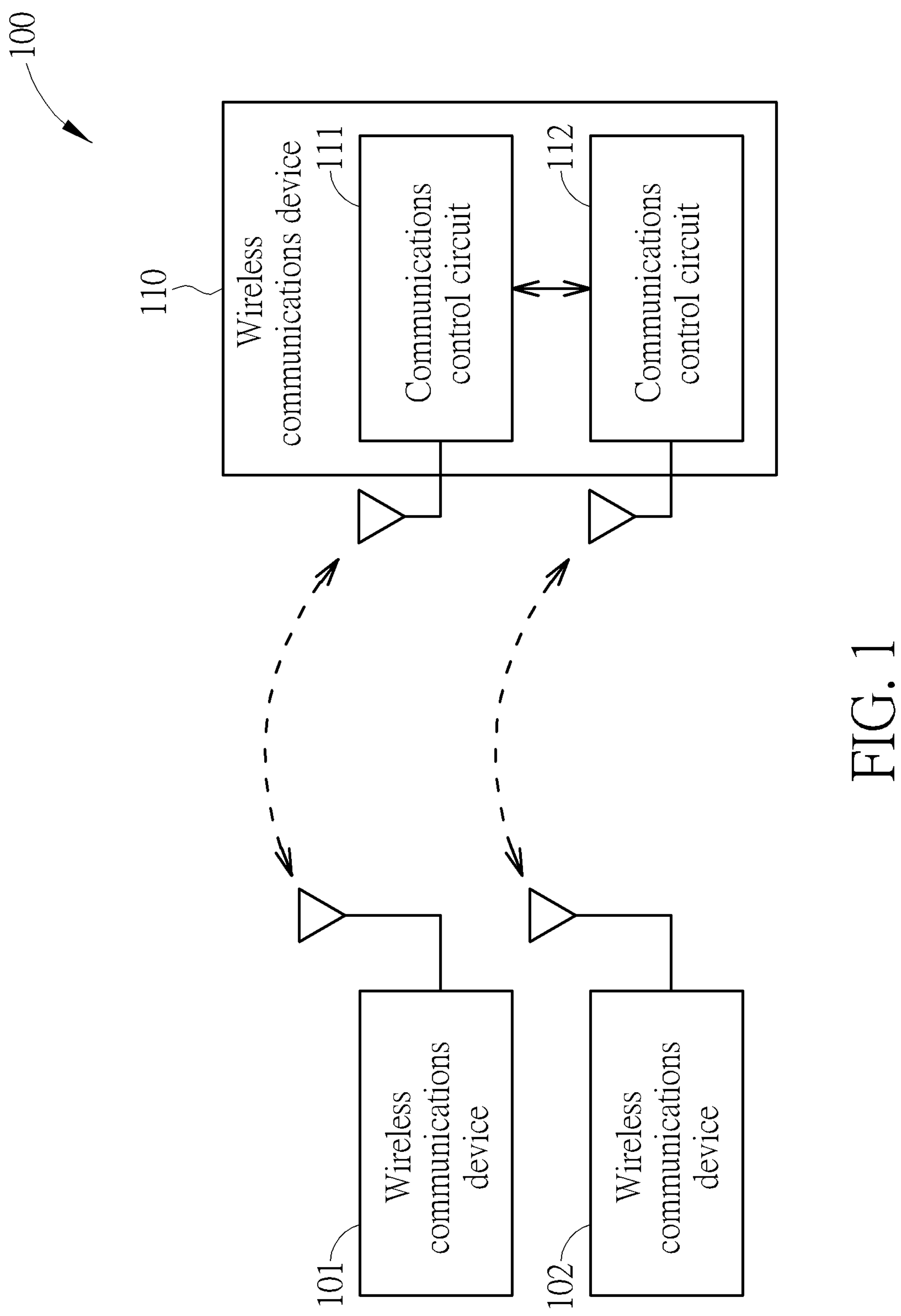
FIG. 1 is a diagram of a wireless communications system according to an embodiment of the present invention.

FIG. 1 is a diagram of a wireless communications system 100 according to an embodiment of the present invention. The wireless communications system 100 may comprise multiple wireless communications devices that operate according to various protocols to provide different types of communications services to a user, such as a wireless communications device 110 corresponding to all of the aforementioned different types of communications services, as well as at least two other wireless communications devices 101 and 102 corresponding to the aforementioned different types of communications services, where the wireless communications device 110 may comprise at least two communications control circuits 111 and 112 corresponding to the aforementioned different types of communications services, as well as at least one first antenna coupled to the communications control circuit 111 and at least one second antenna coupled to the communications control circuit 112, but the present invention is not limited thereto. According to some embodiments, the wireless communications device 110 may further comprise at least one processing circuit arranged to control operations of the wireless communications device 110, and the aforementioned at least one processing circuit may control the communications control circuits 111 and 112 to provide the aforementioned different types of communications services to the user.

In the architecture shown in FIG. 1, the communications control circuit 111 may communicate with the wireless communications device 101 in compliance with a first protocol through the aforementioned at least one first antenna, in order to provide a first wireless communications service to the user, and the communications control circuit 112 may communicate with the wireless communications device 102 in compliance with a second protocol through the aforementioned at least one second antenna, in order to provide a second wireless communications service to the user. For example, the wireless communications devices 101 and 110 may be compatible or back-compatible to one or more versions of the Institute of Electrical and Electronics Engineers (IEEE) 802.15 standards, for providing a Bluetooth communications service to the user, and the wireless communications devices 102 and 110 may be compatible or back-compatible to one or more versions of the IEEE 802.11 standards, for providing a Wi-Fi communications service to the user, where the first protocol may represent the IEEE 802.15 protocol and the first wireless communications service may represent the Bluetooth communications service, and the second protocol may represent the IEEE 802.11 protocol and the second wireless communications service may represent the Wi-Fi communications service, but the present invention is not limited thereto. According to some embodiments, the architecture shown in FIG. 1, the communications control circuit count of the communications control circuits in the wireless communications device 110, the other wireless communications device count of the aforementioned at least two other wireless communications devices 101 and 102, the first protocol and the first wireless communications service, and/or the second protocol and the second wireless communications service may vary.

Figure 2:
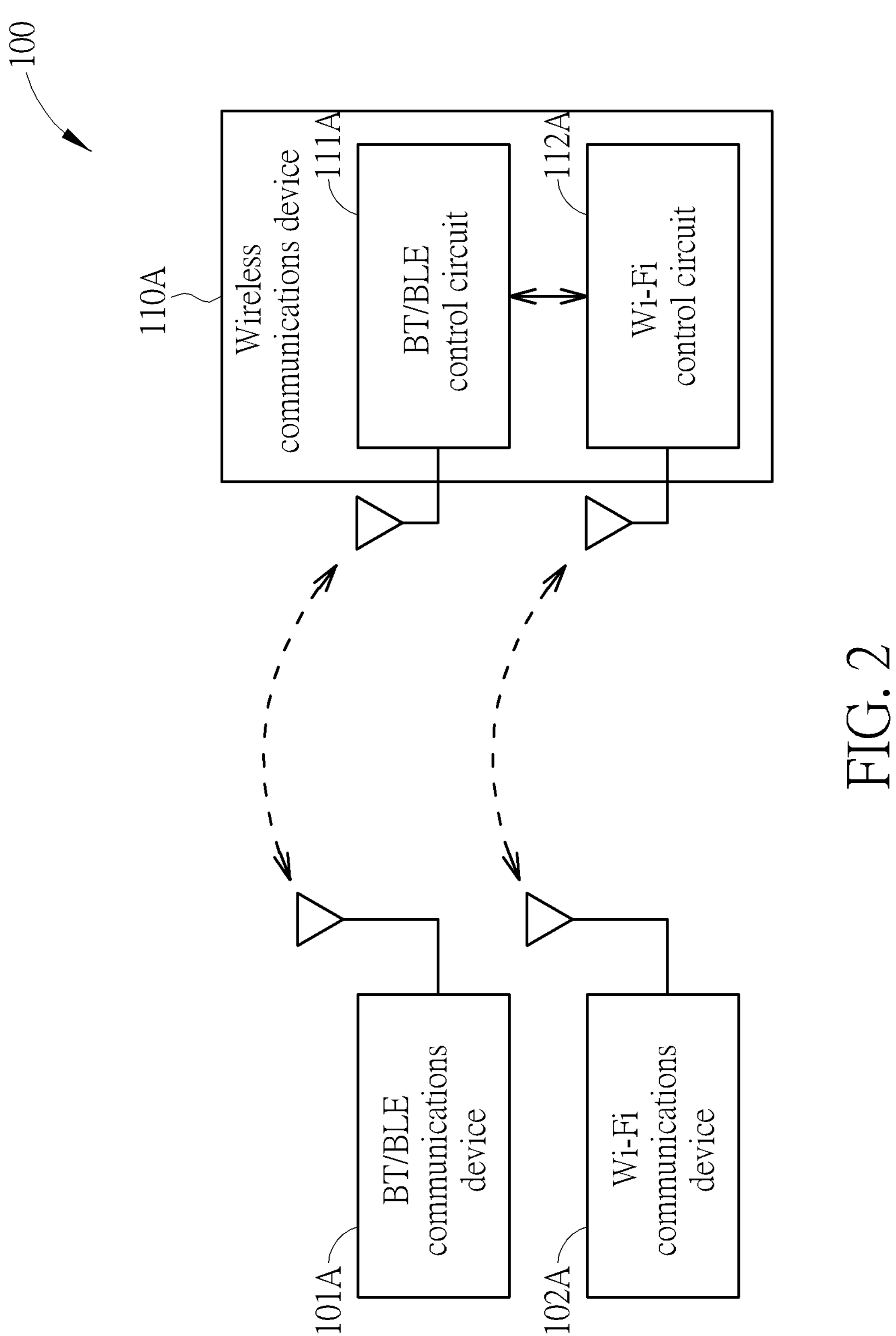
FIG. 2 is a diagram illustrating a first example of the wireless communications devices shown in FIG. 1.
Figure 3:
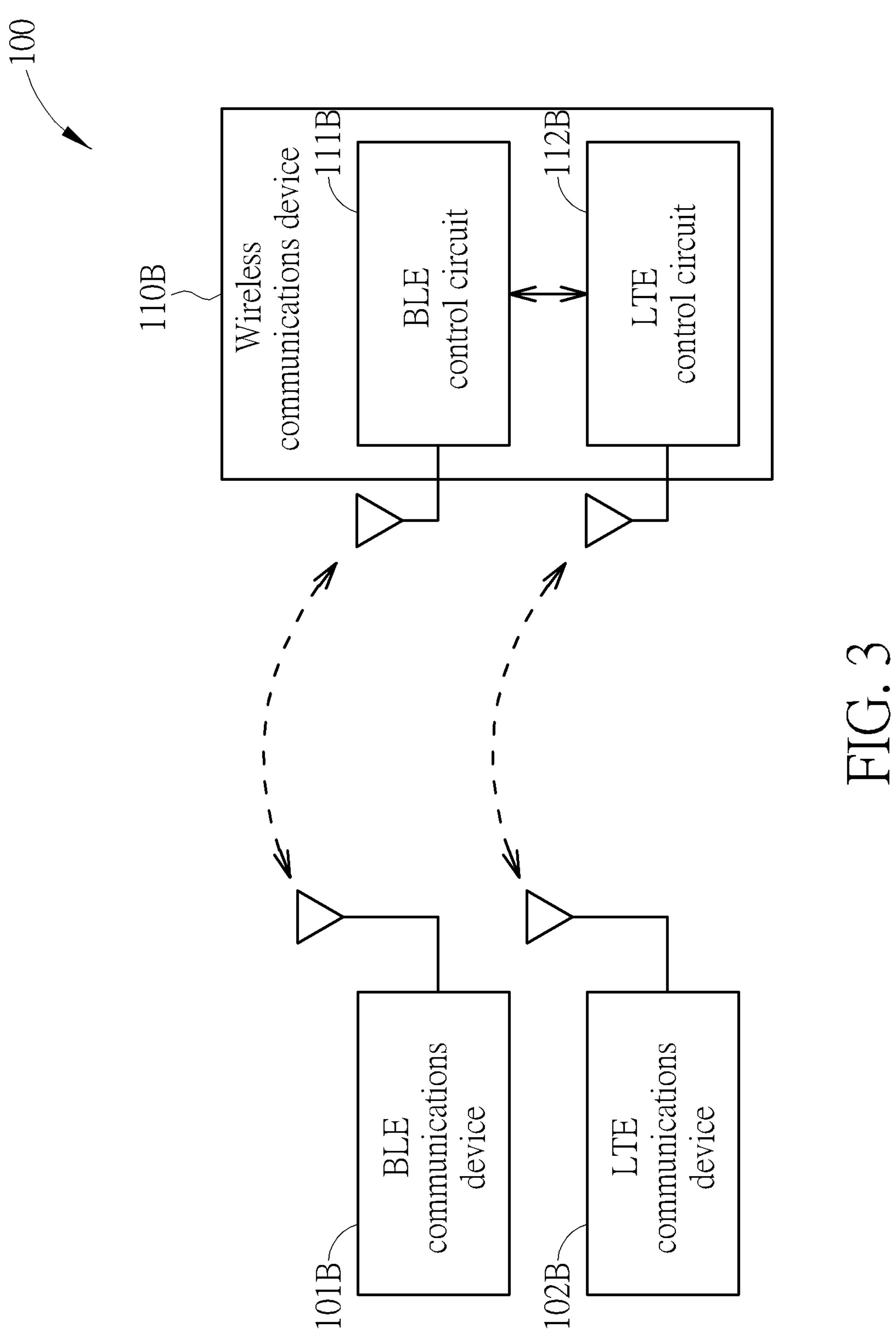
FIG. 3 is a diagram illustrating a second example of the wireless communications devices shown in FIG. 1.
Figure 4:
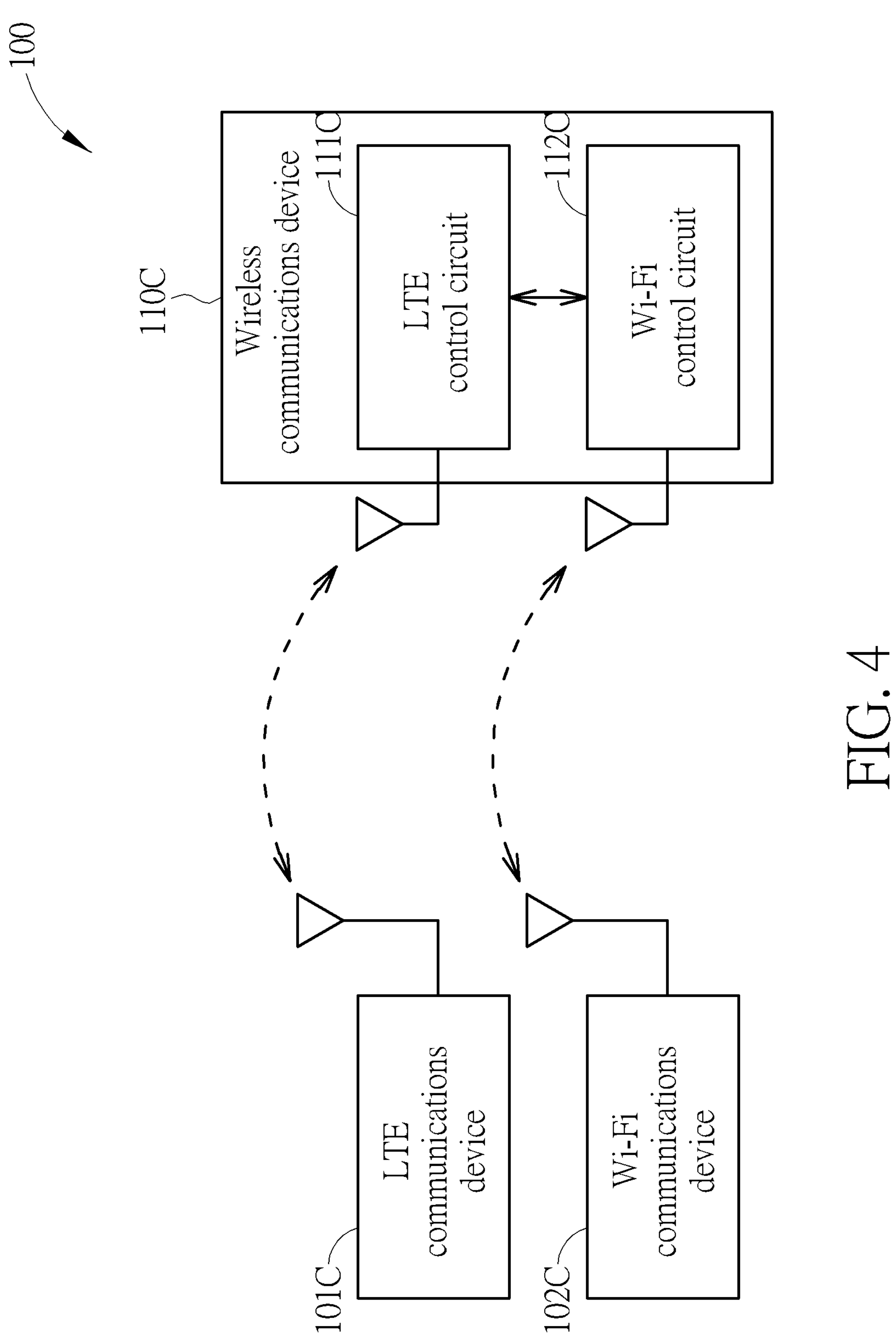
FIG. 4 is a diagram illustrating a third example of the wireless communications devices shown in FIG. 1.
Figure 5:
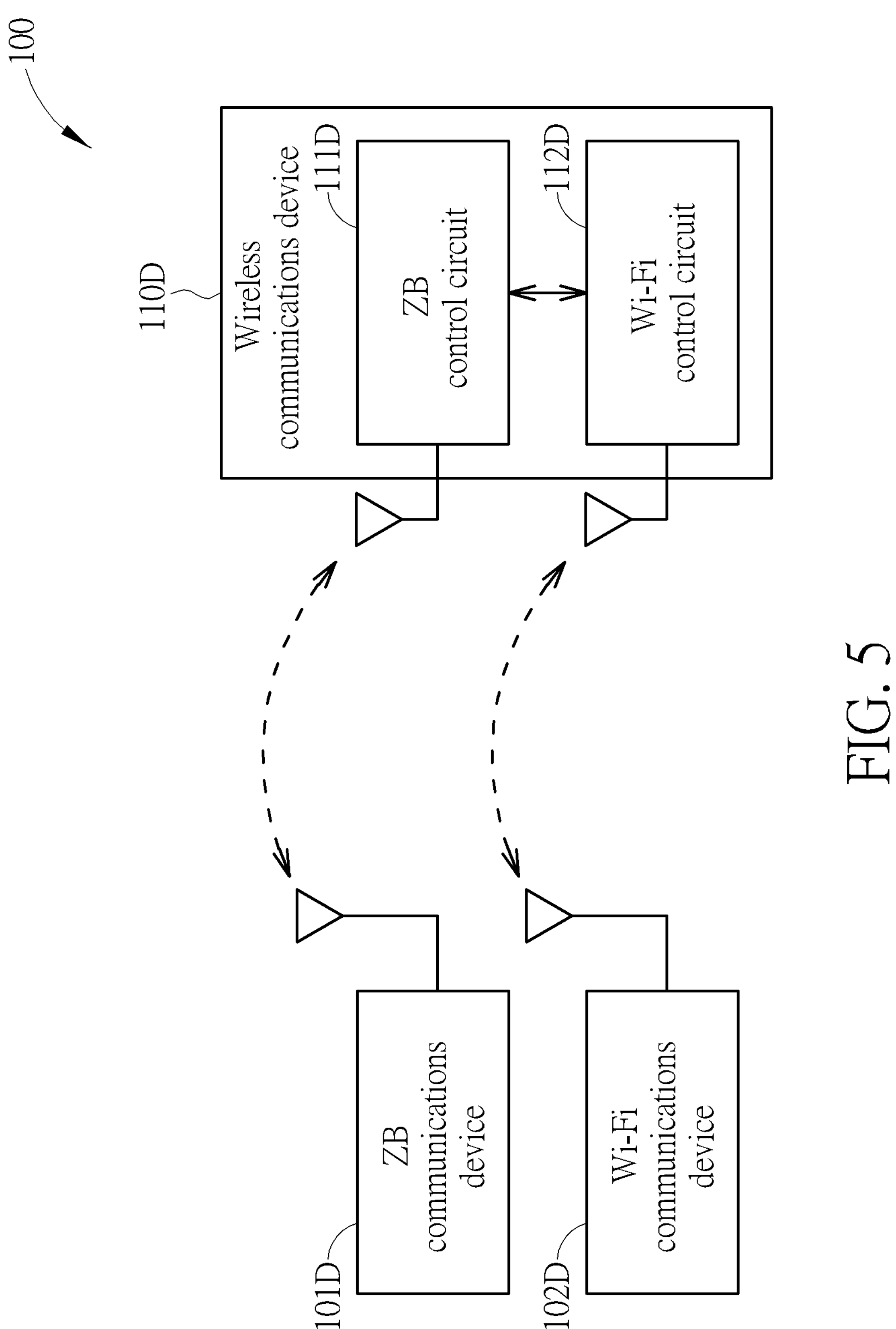
FIG. 5 is a diagram illustrating a fourth example of the wireless communications devices shown in FIG. 1.
Figure 6:
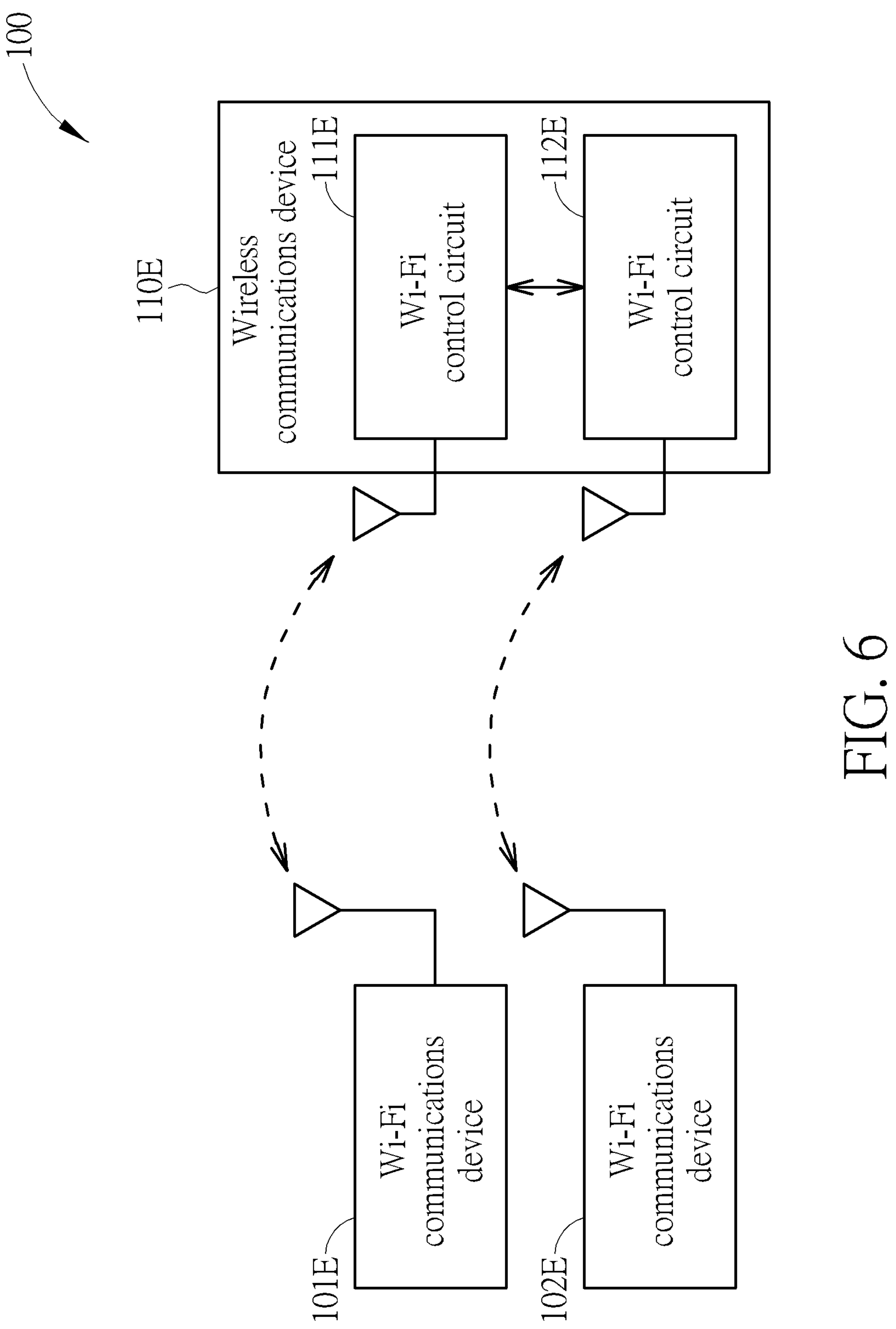
FIG. 6 is a diagram illustrating a fifth example of the wireless communications devices shown in FIG. 1.
Figure 7:
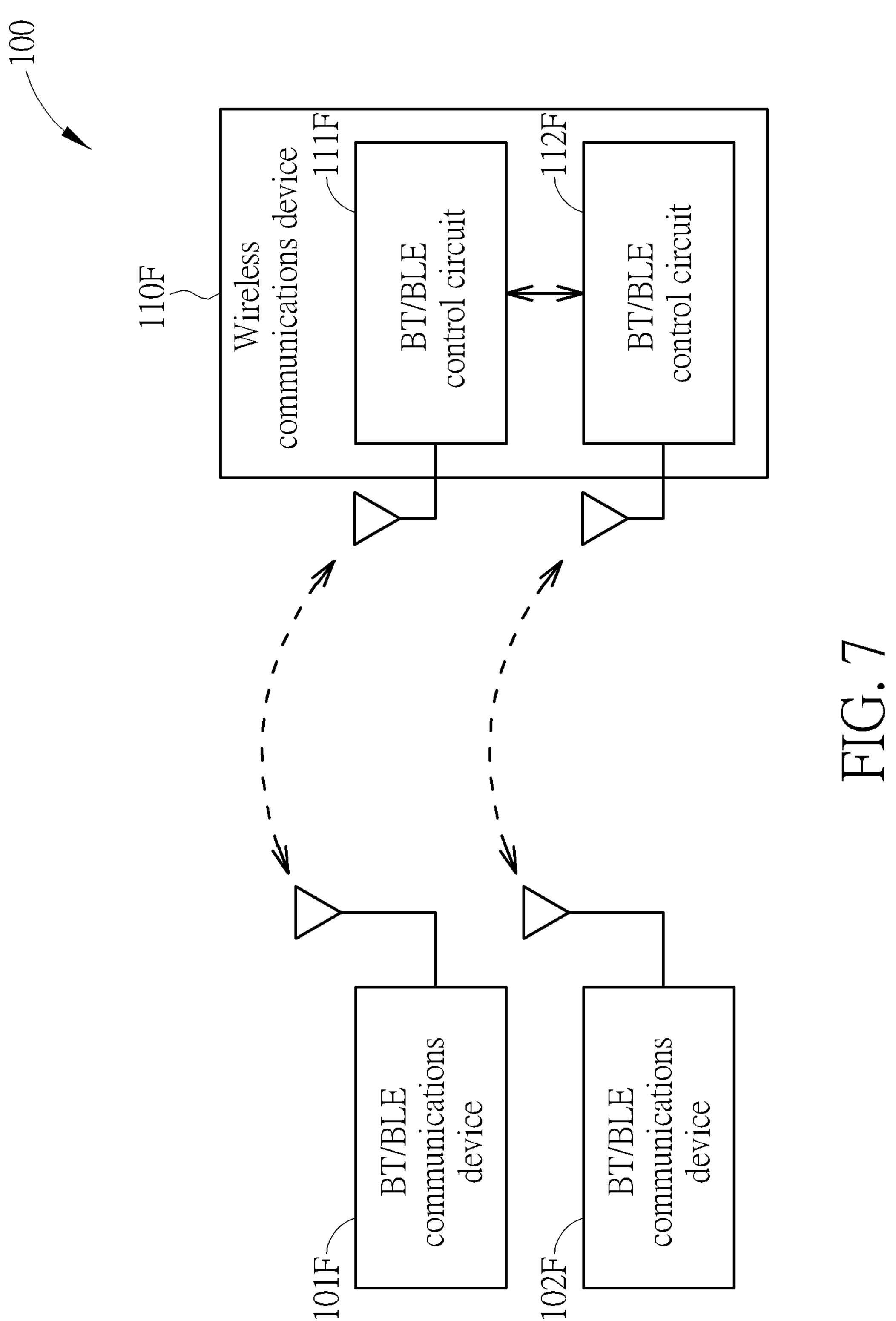
FIG. 7 is a diagram illustrating a sixth example of the wireless communications devices shown in FIG. 1.

For example, any wireless communications service among the first wireless communications service and the second wireless communications service may be implemented as a target wireless communications service among multiple wireless communications services such as a Bluetooth (BT) or Bluetooth Low Energy (BLE) communications service, a Wi-Fi (WF) communications service, a Thread communications service, a Long Term Evolution (LTE) communications service, a ZigBee (ZB) communications service, etc., and the associated communications control circuit (e.g., a corresponding communications control circuit among the communications control circuits 111 and 112) and the associated other wireless communications device (e.g., a corresponding wireless communications device among the wireless communications devices 101 and 102) for providing the aforementioned any wireless communications service to the user may be implemented to conform to a target protocol among the associated protocols. For better comprehension, some examples corresponding to a portion of combinations of the multiple wireless communications services regarding the architecture shown in FIG. 1 may be illustrated as shown in FIG. 2, FIG. 3, FIG. 4, FIG. 5, FIG. 6 and FIG. 7:

(1) FIG. 2 is a diagram illustrating a first example of the wireless communications devices 101, 102 and 110 shown in FIG. 1, where the wireless communications devices 101 and 102 may be implemented as a BT/BLE communications device 101A and a Wi-Fi communications device 102A, respectively, and the communications control circuits 111 and 112 may be implemented as a BT/BLE control circuit 111A and a Wi-Fi control circuit 112A, respectively, and thus the wireless communications device 110 of the first example may be referred to as the wireless communications device 110A;

(2) FIG. 3 is a diagram illustrating a second example of the wireless communications devices 101, 102 and 110 shown in FIG. 1, where the wireless communications devices 101 and 102 may be implemented as a BLE communications device 101B and an LTE communications device 102B, respectively, and the communications control circuits 111 and 112 may be implemented as a BLE control circuit 111B and an LTE control circuit 112B, respectively, and thus the wireless communications device 110 of the second example may be referred to as the wireless communications device 110B;

(3) FIG. 4 is a diagram illustrating a third example of the wireless communications devices 101, 102 and 110 shown in FIG. 1, where the wireless communications devices 101 and 102 may be implemented as an LTE communications device 101C and a Wi-Fi communications device 102C, respectively, and the communications control circuits 111 and 112 may be implemented as an LTE control circuit 111C and a Wi-Fi control circuit 112C, respectively, and thus the wireless communications device 110 of the third example may be referred to as the wireless communications device 110C;

(4) FIG. 5 is a diagram illustrating a fourth example of the wireless communications devices 101, 102 and 110 shown in FIG. 1, where the wireless communications devices 101 and 102 may be implemented as a ZB communications device 101D and a Wi-Fi communications device 102D, respectively, and the communications control circuits 111 and 112 may be implemented as a ZB control circuit 111D and a Wi-Fi control circuit 112D, respectively, and thus the wireless communications device 110 of the fourth example may be referred to as the wireless communications device 110D;

(5) FIG. 6 is a diagram illustrating a fifth example of the wireless communications devices 101, 102 and 110 shown in FIG. 1, where the wireless communications devices 101 and 102 may be implemented as Wi-Fi communications devices 101E and 102E, respectively, and the communications control circuits 111 and 112 may be implemented as Wi-Fi control circuits 111E and 112E, respectively, and thus the wireless communications device 110 of the fifth example may be referred to as the wireless communications device 110E; and (6) FIG. 7 is a diagram illustrating a sixth example of the wireless communications devices 101, 102 and 110 shown in FIG. 1, where the wireless communications devices 101 and 102 may be implemented as BT/BLE communications devices 101F and 102F, respectively, and the communications control circuits 111 and 112 may be implemented as BT/BLE control circuits 111F and 112F, respectively, and thus the wireless communications device 110 of the sixth example may be referred to as the wireless communications device 110F;

but the present invention is not limited thereto. In some other examples, the architecture shown in FIG. 1 may vary according to other combinations of the multiple wireless communications services.

According to some embodiments, any communications control circuit among the communications control circuits 111 and 112 can be implemented by way of at least one processor/microprocessor, at least one random access memory (RAM), at least one bus, etc., but the present invention is not limited thereto. For example, the communications control circuits 111 and 112 can be integrated into a System on Chip (SoC).

According to some embodiments, the wireless communications device 110 (or the communications control circuits 111 and 112) in the architecture shown in FIG. 1 may selectively operate according to a frequency-division duplexing (FDD) control scheme, a time-division-duplexing (TDD) control scheme or a Hybrid 1.0 (or version 1.0) control scheme. For example, when operating according to the FDD control scheme, the communications control circuit 111 such as the BT/BLE control circuit 111A and the communications control circuit 112 such as the Wi-Fi control circuit 112A may be arranged to transmit and receive concurrently, where Wi-Fi Tx packets may impact BT Rx packets, and BT Tx packets may impact Wi-Fi Rx packets. For another example, when operating according to the TDD control scheme, the communications control circuit 111 such as the BT/BLE control circuit 111A and the communications control circuit 112 such as the Wi-Fi control circuit 112A may be arranged to share the airtime, and they (or their Tx/Rx operations and/or associated signals) will not interfere with each other. For yet another example, when operating according to the Hybrid 1.0 control scheme, the communications control circuit 111 such as the BT/BLE control circuit 111A and the communications control circuit 112 such as the Wi-Fi control circuit 112A may be arranged to transmit and receive concurrently except the case of coexistence of Wi-Fi Tx and BT Rx operations, and the communications control circuit 112 such as the Wi-Fi control circuit 112A may use a protection frame when the BT Tx duty is heavy.

Figure 8:
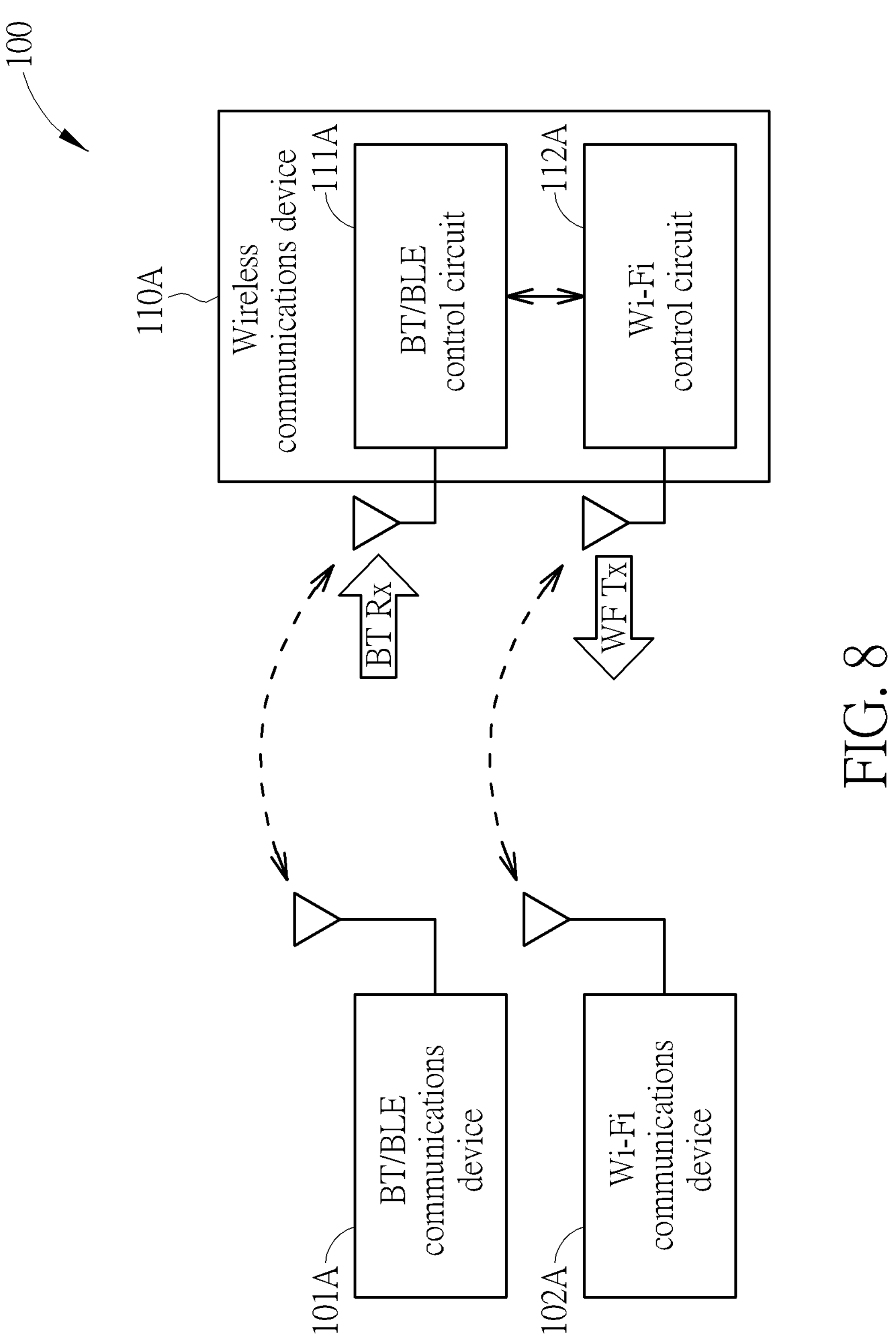
FIG. 8 illustrates a Hybrid 1.0 control scheme that is applicable to the wireless communications system shown in FIG. 1.

FIG. 8 illustrates the Hybrid 1.0 control scheme that is applicable to the wireless communications system 100 shown in FIG. 1, where the wireless communications devices 101, 102 and 110 in the architecture shown in FIG. 1 may be illustrated as the BT/BLE communications device 101A, the Wi-Fi communications device 102A and the wireless communications device 110A of the first example shown in FIG. 2, respectively, and an Rx operation of the communications control circuit 111 and a Tx operation of the communications control circuit 112 may be illustrated as the Rx operation of the BT/BLE control circuit 111A and the Tx operation of the Wi-Fi control circuit 112A, respectively (labeled "BT Rx" and "WF Tx" for brevity), but the present invention is not limited thereto. As there may be various combinations of the multiple wireless communications services regarding the architecture shown in FIG. 1, the architecture shown in FIG. 8 may be replaced with the architecture of another example corresponding to another combination of the multiple wireless communications services.

When the first wireless communications service is implemented as the Bluetooth communications service, the communications control circuit 111 such as the BT/BLE control circuit 111A may perform communications control of the Bluetooth communications service, and more particularly, perform wireless communications operations with the wireless communications device 101 such as the BT/BLE communications device 101A according to the IEEE 802.15 protocol for the wireless communications device 110 such as the wireless communications device 110A, in order to provide the Bluetooth communications service to the user. Example of the wireless communications device 101 may include, but are not limited to: a wireless Bluetooth headset, a wireless keyboard, and a wireless mouse. In addition, when the second wireless communications service is implemented as the Wi-Fi communications service, the communications control circuit 112 such as the Wi-Fi control circuit 112A may perform communications control of the Wi-Fi communications service, and more particularly, perform wireless communications operations with the wireless communications device 102 such as the Wi-Fi communications device 102A according to the IEEE 802.11 protocol for the wireless communications device 110 such as the wireless communications device 110A, in order to provide the Wi-Fi communications service to the user, where the communications control circuit 112 (e.g., the Wi-Fi control circuit 112A) may act as a STA in a Wireless Local Area Network (WLAN), and the wireless communications device 102 (e.g. the Wi-Fi communications device 102A) may act as an access point (AP) in the WLAN. Example of the wireless communications device 102 may include, but are not limited to: a Wi-Fi router. Example of the wireless communications device 110 may include, but are not limited to: a multifunctional mobile phone, a tablet computer, a laptop computer and an all-in-one computer. According to some embodiments, the wireless communications device 102 may act as any of the AP, another STA and a WLAN base station (BS) in the WLAN.

Based on the Hybrid 1.0 control scheme, the communications control circuit 112 (e.g., the Wi-Fi control circuit 112A) may perform Wi-Fi Rx operations in BT operation time, in order to achieve a higher Wi-Fi throughput. In addition, the communications control circuit 112 (e.g., the Wi-Fi control circuit 112A) may perform a Wi-Fi Tx operation (labeled "WF Tx" for brevity) when there is a need. As BT Rx operations may be easily affected by interference, the communications control circuit 112 (e.g., the Wi-Fi control circuit 112A) may be arranged to abort the Wi-Fi Tx operation in BT operation time, for example, when the communications control circuit 111 (e.g., the BT/BLE control circuit 111A) is performing a BT Rx operation (labeled "BT Rx" for brevity), in order to achieve stable BT-service (or BT-service-related) user experience. This may be helpful on achieving the stable BT-service user experience, but may lead to a side effect. Regarding the Wi-Fi service, the wireless communications device 110 may have received a lot of data but cannot transmit a response packet.

For example, the wireless communications device 110 (e.g., the wireless communications device 110A) may have received multiple medium access control (MAC) protocol data units (MPDUs) or at least one aggregate MPDU (A-MPDU) from the wireless communications device 102 by using the communications control circuit 112, and need to send a block acknowledgment (BA) packet in response to successfully receiving the multiple MPDUs or the aforementioned at least one A-MPDU toward the wireless communications device 102. At the same moment, in response to detecting that the communications control circuit 111 (e.g., the BT/BLE control circuit 111A) is performing the BT Rx operation, the communications control circuit 112 (e.g., the Wi-Fi control circuit 112A) may abort the Wi-Fi Tx operation such as the operation of transmitting the BA packet in order to achieve the stable BT-service user experience, causing the wireless communications device 102 to perform a re-transmission operation for the case that no BA packet from the communications control circuit 112 regarding the multiple MPDUs or the aforementioned at least one A-MPDU is received. As a result, the wireless communications device 102 may ask for decreasing the data rate such as the physical layer (PHY) rate, and therefore, the wireless communications device 102 and the communications control circuit 112 may communicate with each other at a lower data rate such as the decreased PHY rate later, for example, at least for a while, causing the overall transmission speed between the wireless communications device 102 and the communications control circuit 112 to be decreased and/or causing the Rx throughput of the communications control circuit 112 to be unstable.

Figure 9:
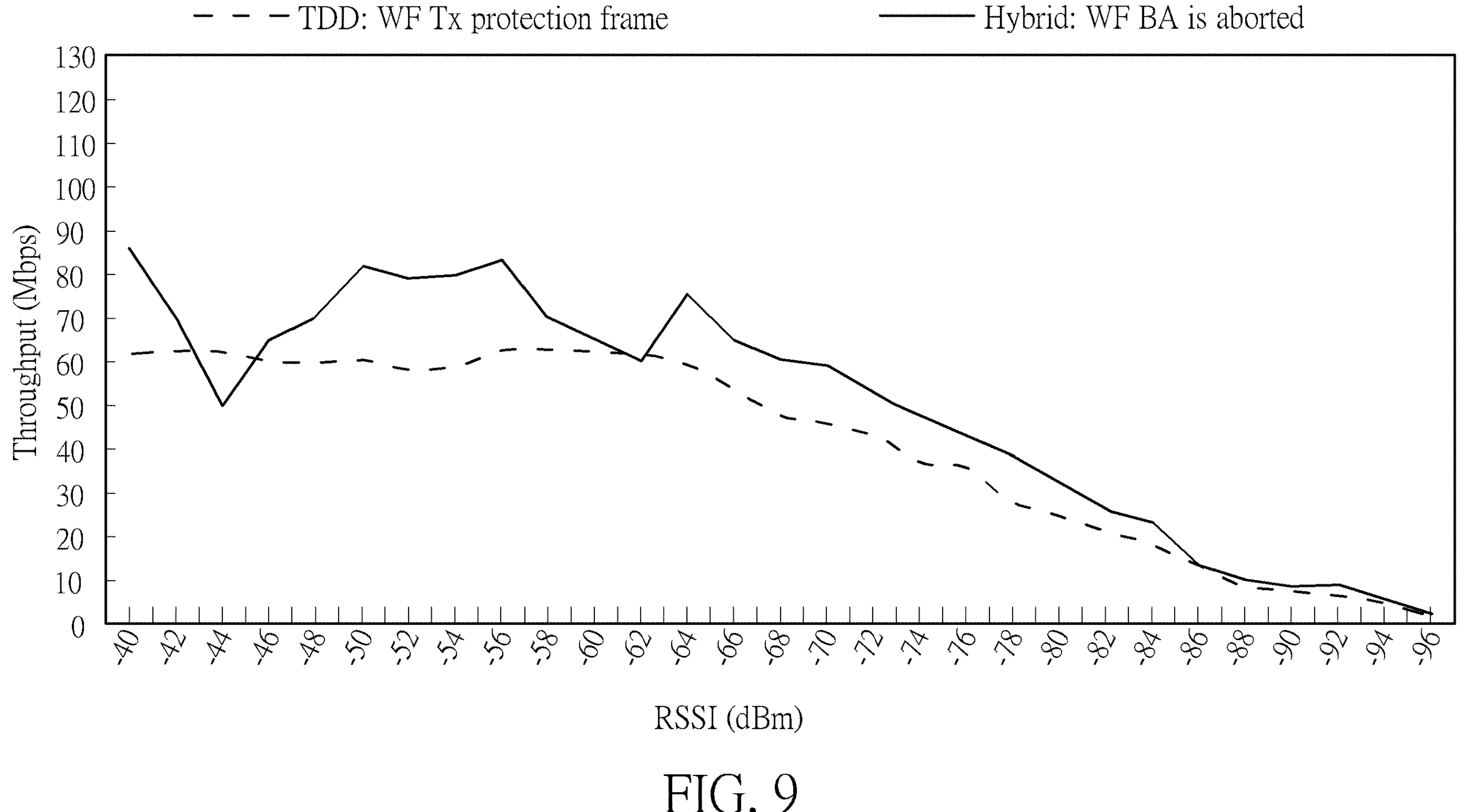
FIG. 9 illustrates the Rx throughput with respect to the received signal strength indicator (RSSI) for a time-division-duplexing (TDD) control scheme and the Hybrid 1.0 control scheme, respectively.

FIG. 9 illustrates the Rx throughput with respect to the RSSI for the TDD control scheme and the Hybrid 1.0 control scheme (labeled "TDD" and "Hybrid" for brevity), respectively, where the horizontal axis may represent the RSSI measured in unit of decibel-milliwatts (dBm) at the communications control circuit 112 (e.g., the Wi-Fi control circuit 112A), and the vertical axis may represent the Rx throughput measured in unit of megabits per seconds (Mbps), such as the throughput corresponding to the Rx operations at the communications control circuit 112. For example, the wireless communications device 110 shown in FIG. 1 may be configured to have a set of predetermined settings such as a Wi-Fi bandwidth of 20 megahertz (MHz), an isolation of 15 decibel (dB) between the communications control circuits 111 and 112, etc., and may selectively operate according to the TDD control scheme or the Hybrid 1.0 control scheme, but the present invention is not limited thereto.

The curve corresponding to the TDD control scheme may be obtained when the wireless communications device 110 is operating according to the TDD control scheme. For example, the Rx throughput of the communications control circuit 112 may be quite limited since the airtime is shared, and using a Wi-Fi Tx protection frame in the TDD control scheme may cause a peak throughput being limited by Wi-Fi radio. In addition, the curve corresponding to the Hybrid 1.0 control scheme may be obtained when the wireless communications device 110 is operating according to the Hybrid 1.0 control scheme. For example, the Rx throughput of the communications control circuit 112 may be unstable since the communications control circuit 112 cannot transmit a response packet such as the BA packet in some situations. More particularly, when the communications control circuit 111 such as the BT/BLE control circuit 111A is performing the BT Rx operation, the BA packet needing to be transmitted by the communications control circuit 112 such as the Wi-Fi control circuit 112A is aborted (labeled "WF BA is aborted" in FIG. 9 for brevity).

FIG. 10 illustrates an adaptive Tx power control scheme of a method for performing transmission and reception control of a wireless communications device according to an embodiment of the present invention. For example, the communications control circuit 111 such as the BT/BLE control circuit 111A may determine at least one indication regarding the communications control circuit 111, for being sent to the communications control circuit 112, and the communications control circuit 112 such as the Wi-Fi control circuit 112A may receive the aforementioned at least one indication from the communications control circuit 111 such as the BT/BLE control circuit 111A, for indicating at least one behavior of the communications control circuit 111. In addition, the communications control circuit 112 such as the Wi-Fi control circuit 112A may determine transmission power of the communications control circuit 112 at least according to whether multiple conditions related to the communications control circuit 111 are met, for performing Wi-Fi transmission power level control (labeled "WF TX power level control" for brevity), and more particularly, controlling respective transmission power levels of multiple packets {PKT} from the communications control circuit 112 to the wireless communications device 102 such as the Wi-Fi communications device in a per-packet manner, where the multiple conditions may comprise at least one condition which is dependent on the aforementioned at least one indication.

Regarding the aforementioned at least one indication, multiple cases corresponding to various combinations of the multiple wireless communications services mentioned above may be illustrated for better comprehension. For example, the multiple cases may comprise:

(1) the BT/Wi-Fi case of the first example shown in FIG. 2, where the communications control circuit 112 such as the Wi-Fi control circuit 112A may perform the Wi-Fi transmission power level control according to the indications bt_rx_rw, bt_tx_active, bt_rx_active and bt_find_acc_code from the communications control circuit 111 such as the BT/BLE control circuit 111A;

(2) the Wi-Fi/Wi-Fi case of the fifth example shown in FIG. 6, where the communications control circuit 112 such as the Wi-Fi control circuit 112E may perform the Wi-Fi transmission power level control according to the indications wf_tx_active, wf_rx_active and wf_rx_decode from the communications control circuit 111 such as the other Wi-Fi control circuit 112E;

(3) the ZB/Wi-Fi case of the fourth example shown in FIG. 5, where the communications control circuit 112 such as the Wi-Fi control circuit 112D may perform the Wi-Fi transmission power level control according to the indications zb_tx_active, zb_rx_active and zb_rx_info_vld from the communications control circuit 111 such as the ZB control circuit 111D;

(4) the BT1/Wi-Fi case varied from the BT/Wi-Fi case, where the communications control circuit 112 such as the Wi-Fi control circuit 112A may perform the Wi-Fi transmission power level control according to the indications bt1_rx_rw, bt1_tx_active, bt1_rx_active and bt1_rx_decode from the communications control circuit 111 such as the BT/BLE control circuit 111A, and the BT/BLE control circuit 111A may be implemented as a LTE/Thread BT (BT1 or "LITBT") control circuit corresponding to a variation version of the BT/BLE communications service, for example, as a result of further using the LTE technology and/or the Thread technology in the BT/BLE control circuit 111A; and (5) the WF1/Wi-Fi case varied from the Wi-Fi/Wi-Fi case, where the communications control circuit 112 such as the Wi-Fi control circuit 112E may perform the Wi-Fi transmission power level control according to the indications wf1_rx_active and wf1_rx_decode from the communications control circuit 111 such as the Wi-Fi control circuit 111E, and the Wi-Fi control circuit 111E may be implemented as a LTE/Thread Wi-Fi (WF1 or "LITWF") control circuit corresponding to a variation version of the Wi-Fi communications service, for example, as a result of further using the LTE technology and/or the Thread technology in the Wi-Fi control circuit 111E;

where the respective indications of the cases listed above may be taken as examples of the aforementioned at least one indication, and the symbol "--" may indicate that the field in which it is labeled may be omitted when there is no indication corresponding to this field in a certain case among these cases, but the present invention is not limited thereto. According to some embodiments, the multiple cases, the aforementioned at least one indication, and/or the associated Wi-Fi transmission power level control may vary.

Based on the adaptive Tx power control scheme shown in FIG. 10, the communications control circuit 112 such as the Wi-Fi control circuit 112A may transmit the multiple packets {PKT} with the respective transmission power levels thereof from the communications control circuit 112 to the wireless communications device 102 such as the Wi-Fi communications device 102A, rather than aborting the transmission of the communications control circuit 112 directly for preventing the communications control circuit 111 such as the BT/BLE control circuit 111A from being affected by the communications control circuit 112, in order to enhance the Rx throughput of the communications control circuit 112. For example, the multiple packets {PKT} may comprise a BA packet such as that mentioned above, and the communications control circuit 112 such as the Wi-Fi control circuit 112A may transmit the BA packet with a controlled transmission power level thereof in response to receiving the multiple MPDUs or the aforementioned at least one A-MPDU from the wireless communications device 102, rather than aborting the transmission of the BA packet directly, in order to prevent the re-transmission from the wireless communications device 102 to the communications control circuit 112, and thereby enhance the Rx throughput of the communications control circuit 112.

Taking the partial table contents 511 corresponding to the BT/Wi-Fi case as an example, while temporarily omitting the partial table contents 512, 513, 514 and 515 respectively corresponding to the Wi-Fi/Wi-Fi case, the ZB/Wi-Fi case, the BT1/Wi-Fi case and the WF1/Wi-Fi case, the communications control circuit 112 such as the Wi-Fi control circuit 112A may perform the Wi-Fi transmission power level control according to the multiple conditions such as the aforementioned at least one condition, and the aforementioned at least one indication on which the aforementioned at least one condition is dependent may comprise:

(1) a first estimated remaining time indication such as the indication bt_rx_rw, for indicating the estimated time Time_Remaining of a remaining window (RW), such as the time Time_Remaining remaining for the communications control circuit 112 (e.g., the Wi-Fi control circuit 112A) to do something, before a next Rx operation (e.g., the next BT Rx operation) of the communications control circuit 111 (e.g., the BT/BLE control circuit 111A), where the multiple conditions may comprise a first condition which is dependent on the first estimated remaining time indication, such as the condition of the first estimated remaining time indication (e.g., the indication bt_rx_rw) being greater than a default value (e.g., the value 0) corresponding to an invalid range;

(2) a first transmission-active indication such as the indication bt_tx_active, for indicating whether the communications control circuit 111 is active on packet transmission, where the multiple conditions may comprise a second condition which is dependent on the first transmission-active indication, such as the condition of the first transmission-active indication (e.g., the indication bt_tx_active) being equal to a first predetermined logic value (e.g., the value 1);

(3) a first reception-active indication such as the indication bt_rx_active, for indicating whether the communications control circuit 111 is active on packet reception, where the multiple conditions may comprise a third condition which is dependent on the first reception-active indication, such as the condition of the first reception-active indication (e.g., the indication bt_rx_active) being equal to the first predetermined logic value (e.g., the value 1); and (4) a first reception-information-valid indication such as the indication bt_find_acc_code, for indicating whether information being obtained from packet reception by the communications control circuit 111 is valid, where the multiple conditions may comprise a fourth condition which is dependent on the first reception-information-valid indication, such as the condition of the first reception-information-valid indication (e.g., the indication bt_find_acc_code) being equal to the first predetermined logic value (e.g., the value 1);

but the present invention is not limited thereto. For example, the default value, the first predetermined logic value, the indications listed above, and/or the associated condition may vary.

In addition, the associated operations of the Wi-Fi transmission power level control may comprise:

(1) when (bt_rx_rw, bt_tx_active, bt_rx_active and bt_find_acc_code)=(0, 0, 0, 0), the communications control circuit 112 such as the Wi-Fi control circuit 112A may determine a transmission power level of a packet (e.g., the packet PKT1) among the multiple packets {PKT} to be equal to a high power level CR0 (labeled "High" for brevity) at this moment, and send this packet with the high power level CR0 to the wireless communications device 102;

(2) when (bt_rx_rw, bt_tx_active, bt_rx_active and bt_find_acc_code)=(0, 1, 0, 0), the communications control circuit 112 such as the Wi-Fi control circuit 112A may determine a transmission power level of a packet (e.g., the packet PKT2) among the multiple packets {PKT} to be equal to a normal power level CR1 (labeled "Normal" for brevity) at this moment, and send this packet with the normal power level CR1 to the wireless communications device 102;

(3) when (bt_rx_rw, bt_tx_active, bt_rx_active and bt_find_acc_code)=(0, 0, 1, 0), the communications control circuit 112 such as the Wi-Fi control circuit 112A may determine a transmission power level of a packet (e.g., the packet PKT3) among the multiple packets {PKT} to be equal to a FDD power level CR2 (labeled "FDD" for brevity) at this moment, and send this packet with the FDD power level CR2 to the wireless communications device 102;

(4) when (bt_rx_rw, bt_tx_active, bt_rx_active and bt_find_acc_code)=(0, 0, 1, 1), in response to the first reception-information-valid indication (e.g., the indication bt_find_acc_code) indicating that information being obtained from packet reception by the communications control circuit 111 (e.g., the BT/BLE control circuit 111A) is valid, the communications control circuit 112 such as the Wi-Fi control circuit 112A may adaptively determine a transmission power level of a packet (e.g., the packet PKT4) among the multiple packets {PKT} at least according to a predetermined minimum transmission power level CR3 and a first expected transmission power level indication Exp (respectively labeled "WF_TX_Power_min" and "Expected_WF_TX_power" for better comprehension), and transmit this packet with the adaptively determined transmission power level from the communications control circuit 112 to the wireless communications device 102, where the first expected transmission power level indication Exp may be received from the communications control circuit 111, for indicating an expected transmission power level of the communications control circuit 112 that is expected by the communications control circuit 111, such as the expected transmission power Expected_WF_TX_power of the Wi-Fi control circuit 112A that is expected by the BT/BLE control circuit 111A, and the predetermined minimum transmission power level CR3 may be determined in advance and stored in the communications control circuit 112, for indicating the minimum transmission power level of the communications control circuit 112 that is pre-set for the communications control circuit 112 itself by default, such as the minimum transmission power WF_TX_Power_min of the Wi-Fi control circuit 112A that is pre-set for the Wi-Fi control circuit 112A itself by default; and (5) when bt_rx_rw>0, in response to the first estimated remaining time indication (e.g., the indication bt_rx_rw) being in a valid range (e.g., the range of the interval (0, ∞)) of first estimated remaining time indication, for indicating the estimated time Time_Remaining remaining for the communications control circuit 112 before the next Rx operation of the communications control circuit 111, the communications control circuit 112 may adaptively determine a transmission power level of a packet (e.g., the packet PKT5) among the multiple packets {PKT} according to a current packet duration PKT_Duration of this packet and the estimated time Time_Remaining indicated by the first estimated remaining time indication (e.g., the indication bt_rx_rw), and transmit this packet with the adaptively determined transmission power level from the communications control circuit 112 to the wireless communications device 102;

but the present invention is not limited thereto. According to some embodiments, the operations listed above may vary.

More particularly, the wireless communications device 110 (or any communications control circuit among the communications control circuits 111 and 112 therein) may determine a channel spacing indication CSI, for indicating a channel spacing between a second wireless communications channel of the communications control circuit 112 and a first wireless communications channel of the communications control circuit 111. When (bt_rx_rw, bt_tx_active, bt_rx_active and bt_find_acc_code)=(0, 0, 1, 1), the communications control circuit 112 may determine a channel-spacing-dependent transmission power level according to the expected transmission power level Exp and a transmission power level adjustment amount TX_delta associated with the channel spacing indication CSI, where the adaptively determined transmission power level may be equal to a predetermined function of the predetermined minimum transmission power level CR3 and the channel-spacing-dependent transmission power level. For example, the predetermined function may represent a maximum function Max { }, the channel-spacing-dependent transmission power level may represent the summation (Exp+TX_delta) of the expected transmission power level Exp and the transmission power level adjustment amount TX_delta, and therefore the adaptively determined transmission power level may be equal to the maximum of the predetermined minimum transmission power level CR3 and the channel-spacing-dependent transmission power level (labeled "Max {WF_TX_Power_min (CR3), Expected_WF_TX_power (Exp)+TX_delta}" for better comprehension). In addition, when bt_rx_rw>0, the communications control circuit 112 may determine whether the estimated time Time_Remaining indicated by the first estimated remaining time indication (e.g., the indication bt_rx_rw) is greater than the current packet duration PKT_Duration of the packet (e.g., the packet PKT5) to generate a determination result, for selecting a predetermined transmission power level corresponding to the determination result from multiple predetermined transmission power levels (e.g., the power levels CR6 and CR7) to be the adaptively determined transmission power level. For better comprehension, assume that Time_Remaining=bt_rx_rw, having the same measurement unit as that of the current packet duration PKT_Duration, but the present invention is not limited thereto. For example, when the estimated time Time_Remaining or the indication bt_rx_rw reaches the current packet duration PKT_Duration (e.g., bt_rx_rw>PKT_Duration), the communications control circuit 112 may select the normal power level CR6 to be the adaptively determined transmission power level. For another example, when the estimated time Time_Remaining or the indication bt_rx_rw fails to reach the current packet duration PKT_Duration (e.g., bt_rx_rw<PKT_Duration), the communications control circuit 112 may select the FDD power level CR7 to be the adaptively determined transmission power level.

Some implementation details regarding the Wi-Fi/Wi-Fi case, the ZB/Wi-Fi case, the BT1/Wi-Fi case and the WF1/Wi-Fi case may be further described as follows. When taking the partial table contents 512 corresponding to the Wi-Fi/Wi-Fi case as an example while temporarily omitting the partial table contents 511, 513, 514 and 515 respectively corresponding to the BT/Wi-Fi case, the ZB/Wi-Fi case, the BT1/Wi-Fi case and the WF1/Wi-Fi case, the first estimated remaining time indication may be omitted, and the first transmission-active indication, the first reception-active indication and the first reception-information-valid indication may represent the indications wf_tx_active, wf_rx_active and wf_rx_decode, respectively. When taking the partial table contents 513 corresponding to the ZB/Wi-Fi case as an example while temporarily omitting the partial table contents 511, 512, 514 and 515 respectively corresponding to the BT/Wi-Fi case, the Wi-Fi/Wi-Fi case, the BT1/Wi-Fi case and the WF1/Wi-Fi case, the first estimated remaining time indication may be omitted, and the first transmission-active indication, the first reception-active indication and the first reception-information-valid indication may represent the indications zb_tx_active, zb_rx_active and zb_rx_info_vld, respectively. When taking the partial table contents

514 corresponding to the BT1/Wi-Fi case as an example while temporarily omitting the partial table contents 511, 512, 513 and 515 respectively corresponding to the BT/Wi-Fi case, the Wi-Fi/Wi-Fi case, the ZB/Wi-Fi case and the WF1/Wi-Fi case, the first estimated remaining time indication, the first transmission-active indication, the first reception-active indication and the first reception-information-valid indication may represent the indications bt1_rx_rw, bt1_tx_active, bt1_rx_active and bt1_rx_decode, respectively. When taking the partial table contents 515 corresponding to the WF1/Wi-Fi case as an example while temporarily omitting the partial table contents 511, 512, 513 and 514 respectively corresponding to the BT/Wi-Fi case, the Wi-Fi/Wi-Fi case, the ZB/Wi-Fi case and the BT1/Wi-Fi case, the first estimated remaining time indication and the first transmission-active indication may be omitted, and the first reception-active indication and the first reception-information-valid indication may represent the indications wf1_rx_active and wf1_rx_decode, respectively.

Figure 11:
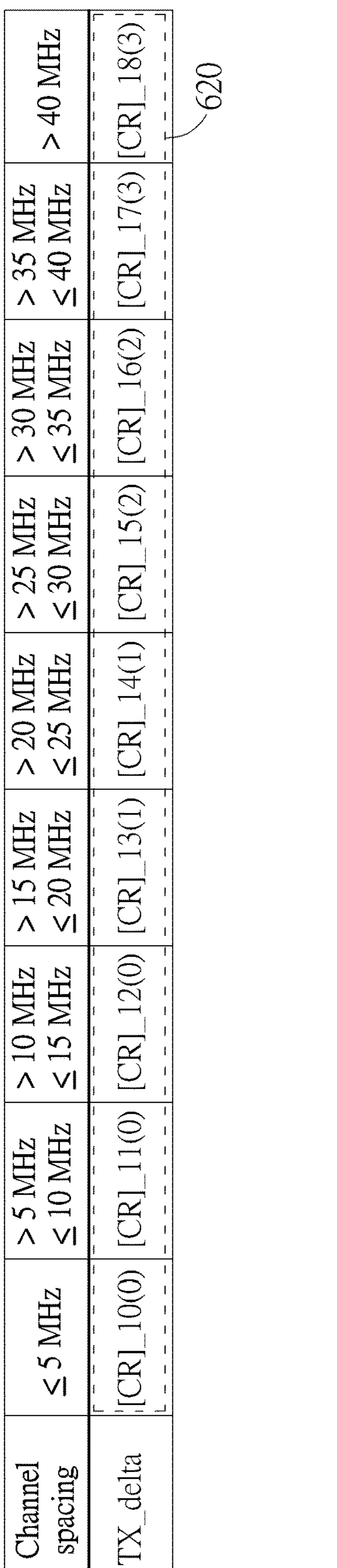
FIG. 11 is a diagram illustrating some implementation details of the adaptive Tx power control scheme shown in FIG. 10 according to an embodiment of the present invention.

FIG. 11 is a diagram illustrating some implementation details of the adaptive Tx power control scheme shown in FIG. 10 according to an embodiment of the present invention. For example, the channel spacing indication CSI mentioned above may correspond to (or point to) the $CSI^{th}$ interval among the channel spacing intervals [0, 5], (5, 10], (10, 15], (15, 20], (20, 25], (25, 30], (30, 35], (35, 40] and (40, ∞) (MHz), for obtaining the $CSI^{th}$ table content among the table contents 620, but the present invention is not limited thereto. In addition, the candidate transmission power level adjustment amounts [CR]_10, [CR]_11, [CR]_12, [CR]_13, [CR]_14, [CR]_15, [CR]_16, [CR]_17 and [CR]_18 of the transmission power level adjustment amount TX_delta may be associated with the channel spacing intervals [0, 5], (5, 10], (10, 15], (15, 20], (20, 25], (25, 30], (30, 35], (35, 40] and (40, ∞) (MHz) and may be respectively equal to predetermined values such as {0, 0, 0, 1, 1, 2, 2, 3, 3} as shown in FIG. 11, but the present invention is not limited thereto. For brevity, similar descriptions for this embodiment are not repeated in detail here.

FIG. 12 illustrates an adaptive Rx gain control scheme of the method according to an embodiment of the present invention. For example, the communications control circuit 111 may determine a reception gain of the communications control circuit 111 according to the respective behaviors of the communications control circuits 111 and 112, for preventing occurrence of any saturation of a first received signal that is received from the wireless communications device 101 by the communications control circuit 111, where the reception gain may be dependent on the transmission power of the communications control circuit 112. More particularly, the wireless communications device 110 (or any communications control circuit among the communications control circuits 111 and 112 therein) may determine whether a first time period of packet reception of the communications control circuit 111 and a second time period of packet transmission of the communications control circuit 112 will overlap each other. When it is determined that the first time period of the packet reception of the communications control circuit 111 and the second time period of the packet transmission of the communications control circuit 112 will overlap each other, the communications control circuit 111 may determine the reception gain of the communications control circuit 111 according to the respective behaviors of the communications control circuits 111 and 112, for preventing the occurrence of the aforementioned any saturation of the first received signal that is received from the wireless communications device 101 by the communications control circuit 111.

In addition, the communications control circuit 111 such as the BT/BLE control circuit 111A may determine a received signal strength of a second received signal that is previously received from the communications control circuit 112 such as the Wi-Fi control circuit 112A by the communications control circuit 111 through the aforementioned at least one first antenna such as the BT antenna(s) (labeled "WF TX power in BT ANT" for brevity), and select a predetermined candidate reception gain from multiple predetermined candidate reception gains according to the received signal strength of the second received signal and the channel spacing indication CSI to be the reception gain of the communications control circuit 111. For example, the multiple predetermined candidate reception gains may comprise an ultra-high reception gain UHG, a high reception gain HG, a medium-high reception gain MHG, a medium reception gain MG, a low reception gain LG and an ultra-low reception gain ULG, where the ultra-high reception gain UHG, the high reception gain HG, the medium-high reception gain MHG, the medium reception gain MG, the low reception gain LG and the ultra-low reception gain ULG may be respectively equal to predetermined values such as {7, 6, 5, 4, 3, 2} as shown in FIG. 12, but the present invention is not limited thereto.

For better comprehension, a predetermined mapping table within the wireless communications device 110 may be arranged to store multiple mapping relationships, for mapping multiple first values {r0, r1, r2, r3, r4, r5, r6, r7, r8} of a first dimension "r" (e.g., the dimension corresponding to the vertical direction in FIG. 12) regarding the received signal strength and multiple second values {c0, c1, c2, c3, c4, c5, c6, c7, c8} of a second dimension "c" (e.g., the dimension corresponding to the horizontal direction in FIG. 12) regarding the channel spacing indication CSI to the multiple predetermined candidate reception gains (e.g., the ultra-high reception gain UHG, the high reception gain HG, the medium-high reception gain MHG, the medium reception gain MG, the low reception gain LG and the ultra-low reception gain ULG), where the multiple second values {c0, c1, c2, c3, c4, c5, c6, c7, c8} maybe taken as examples of the channel spacing indication CSI, and the multiple first values {r0, r1, r2, r3, r4, r5, r6, r7, r8} may be associated with the signal power intervals (−∞,−35], (−35,−30], (−30,−25], (−25,−20], (−20,−15], (−15,−10], (−10,−5], (−5, 0] and (0, ∞) (dBm), respectively. As a result, the communications control circuit 111 may refer to the predetermined mapping table to select the predetermined candidate reception gain from the multiple predetermined candidate reception gains according to the received signal strength of the second received signal and the channel spacing indication CSI to be the reception gain of the communications control circuit 111. For brevity, similar descriptions for this embodiment are not repeated in detail here.

Figure 13:
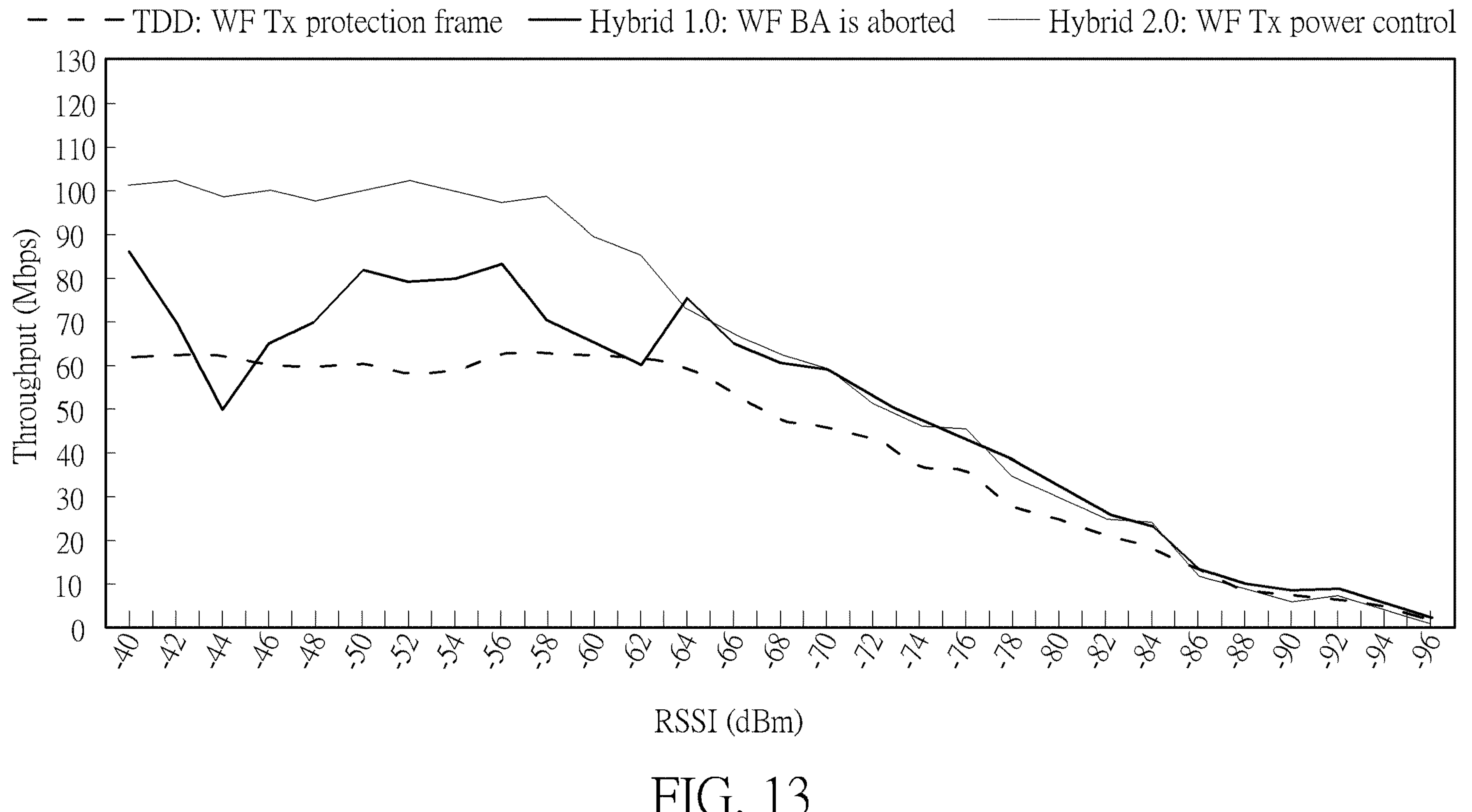
FIG. 13 illustrates the Rx throughput with respect to the RSSI for the TDD control scheme, the Hybrid 1.0 control scheme and a Hybrid 2.0 control scheme, respectively, where the Hybrid 2.0 control scheme may comprise the adaptive Tx power control scheme and the adaptive Rx gain control scheme of the method.

FIG. 13 illustrates the Rx throughput with respect to the RSSI for the TDD control scheme, the Hybrid 1.0 control scheme and a Hybrid 2.0 control scheme, respectively, where the Hybrid 2.0 control scheme may comprise the adaptive Tx power control scheme and the adaptive Rx gain control scheme of the method. In comparison with the TDD control scheme and the Hybrid 1.0 control scheme, the Hybrid 2.0 control scheme applied to the wireless communications device 110 can enhance the overall performance. For brevity, similar descriptions for this embodiment are not repeated in detail here.

Figure 14:
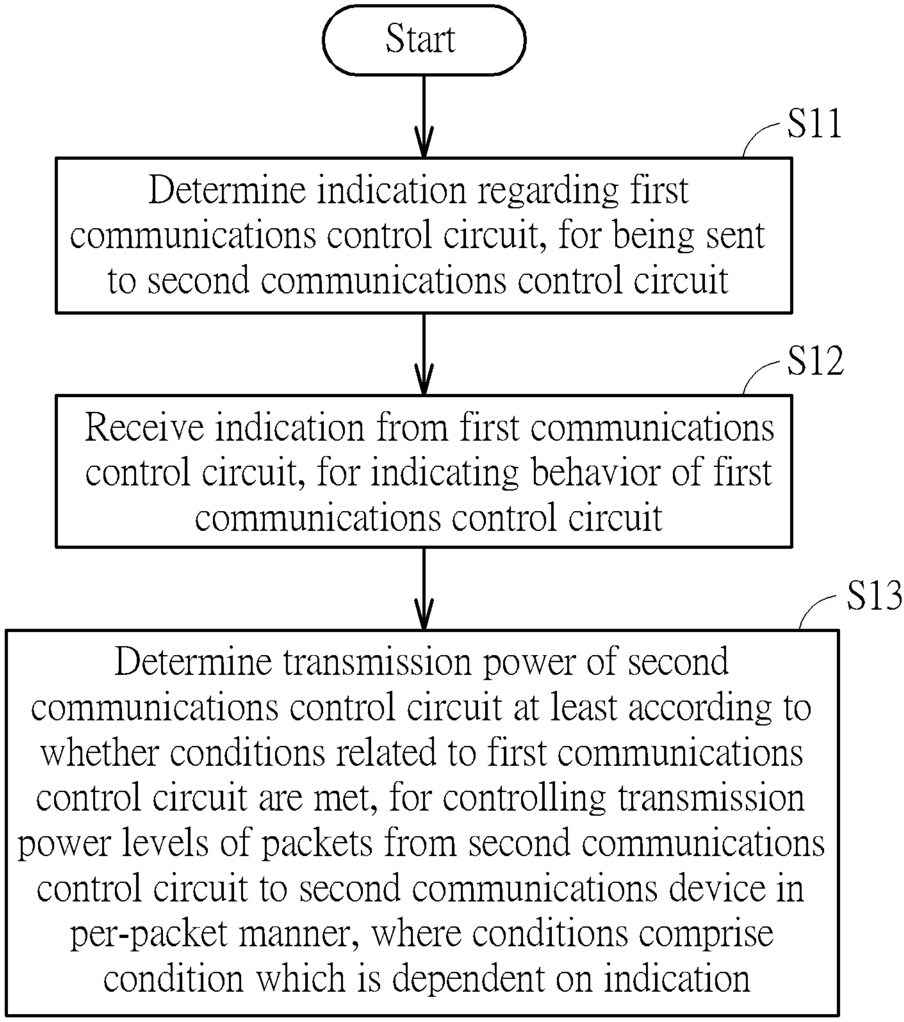
FIG. 14 illustrates a working flow of the method according to an embodiment of the present invention.

FIG. 14 illustrates a working flow of the method according to an embodiment of the present invention. For example, the wireless communications device 110 (or the communications control circuits 111 and 112) in the architecture shown in FIG. 1 may operate according to the working flow shown in FIG. 14, where the first communications control circuit and the second communications control circuit mentioned in Step S11 (or other step(s)) shown in FIG. 14 may represent the communications control circuits 111 and 112 such as the BT/BLE control circuit 111A and the Wi-Fi control circuit 112A, respectively, and the second communications device mentioned in Step S13 shown in FIG. 14 may represent the wireless communications device 102 such as the Wi-Fi communications device 102A, but the present invention is not limited thereto. As there may be various combinations of the multiple wireless communications services regarding the architecture shown in FIG. 1, the operations of Steps S11-S13 may be described with the communications control circuits, the wireless communications device, etc. in the architecture of another example corresponding to another combination of the multiple wireless communications services.

In Step S11, the wireless communications device 110 may utilize the communications control circuit 111 such as the BT/BLE control circuit 111A to determine the aforementioned at least one indication regarding the communications control circuit 111, for being sent to the communications control circuit 112.

In Step S12, the wireless communications device 110 may utilize the communications control circuit 112 such as the Wi-Fi control circuit 112A to receive the aforementioned at least one indication from the communications control circuit 111 such as the BT/BLE control circuit 111A, for indicating the aforementioned at least one behavior of the communications control circuit 111.

In Step S13, the wireless communications device 110 may utilize the communications control circuit 112 such as the Wi-Fi control circuit 112A to determine the transmission power of the communications control circuit 112 at least according to whether the multiple conditions related to the communications control circuit 111 are met, for performing the Wi-Fi transmission power level control, and more particularly, controlling the respective transmission power levels of the multiple packets {PKT} from the communications control circuit 112 to the wireless communications device 102 such as the Wi-Fi communications device 102A in the per-packet manner, where the multiple conditions may comprise the aforementioned at least one condition which is dependent on the aforementioned at least one indication. For brevity, similar descriptions for this embodiment are not repeated in detail here.

For better comprehension, the method may be illustrated with the working flow shown in FIG. 14, but the present invention is not limited thereto. According to some embodiments, one or more steps may be added, deleted, or changed in the working flow shown in FIG. 14.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing transmission and reception control of a wireless communications device, the wireless communications device comprising a first communications control circuit and a second communications control circuit, the first communications control circuit communicating with a first communications device in compliance with a first protocol to provide a first wireless communications service and the second communications control circuit communicating with a second communications device in compliance with a second protocol to provide a second wireless communications service, the method comprising:

utilizing the first communications control circuit to determine at least one indication regarding the first communications control circuit, for being sent to the second communications control circuit;

utilizing the second communications control circuit to receive the at least one indication from the first communications control circuit, for indicating at least one behavior of the first communications control circuit; and utilizing the second communications control circuit to determine transmission power of the second communications control circuit at least according to whether multiple conditions related to the first communications control circuit are met, for controlling respective transmission power levels of multiple packets from the second communications control circuit to the second communications device in a per-packet manner, wherein the multiple conditions comprise at least one condition which is dependent on the at least one indication;

wherein the at least one indication comprises a first estimated remaining time indication, for indicating estimated time of a remaining window, the estimated time being time remaining for the second communications control circuit, before a next receiving operation of the first communications control circuit, wherein the multiple conditions comprise a first condition which is dependent on the first estimated remaining time indication.

2. The method of claim 1, wherein utilizing the second communications control circuit to determine the transmission power of the second communications control circuit at least according to whether the multiple conditions related to the first communications control circuit are met for controlling the respective transmission power levels of the multiple packets from the second communications control circuit to the second communications device in the per-packet manner further comprises:

utilizing the second communications control circuit to transmit the multiple packets with the respective transmission power levels thereof from the second communications control circuit to the second communications device, rather than aborting transmission of the second communications control circuit directly for preventing the first communications control circuit from being affected by the second communications control circuit, in order to enhance a receiving throughput of the second communications control circuit.

3. The method of claim 2, wherein the multiple packets comprises a block acknowledgment (BA) packet; and the second communications control circuit is arranged to transmit the BA packet with a controlled transmission power level thereof in response to receiving multiple medium access control (MAC) protocol data units (MPDUs) or at least one aggregate MPDU (A-MPDU) from the second communications device, rather than aborting transmission of the BA packet directly, in order to prevent re-transmission from the second communications device to the second communications control circuit, and thereby enhance the receiving throughput of the second communications control circuit.

4. The method of claim 1, wherein the at least one indication comprises a first transmission-active indication, for indicating whether the first communications control circuit is active on packet transmission, wherein the multiple conditions comprise a second condition which is dependent on the first transmission-active indication.

5. The method of claim 1, wherein the at least one indication comprises a first reception-active indication, for indicating whether the first communications control circuit is active on packet reception, wherein the multiple conditions comprise a third condition which is dependent on the first reception-active indication.

6. The method of claim 1, wherein the at least one indication comprises a first reception-information-valid indication, for indicating whether information being obtained from packet reception by the first communications control circuit is valid, wherein the multiple conditions comprise a fourth condition which is dependent on the first reception-information-valid indication.

7. The method of claim 1, wherein utilizing the second communications control circuit to determine the transmission power of the second communications control circuit at least according to whether the multiple conditions related to the first communications control circuit are met for controlling the respective transmission power levels of the multiple packets from the second communications control circuit to the second communications device in the per-packet manner further comprises:

in response to a first reception-information-valid indication among the at least one indication indicating that information being obtained from packet reception by the first communications control circuit is valid, utilizing the second communications control circuit to adaptively determine a transmission power level of a first packet among the multiple packets at least according to a predetermined minimum transmission power level and a first expected transmission power level indication, wherein the first expected transmission power level indication is received from the first communications control circuit, for indicating an expected transmission power level that is expected by the first communications control circuit; and utilizing the second communications control circuit to transmit the first packet with the adaptively determined transmission power level from the second communications control circuit to the second communications device.

8. The method of claim 7, further comprising:

determining a channel spacing indication, for indicating a channel spacing between a second wireless communications channel of the second communications control circuit and a first wireless communications channel of the first communications control circuit;

wherein the second communications control circuit is arranged to determine a channel-spacing-dependent transmission power level according to the expected transmission power level and a transmission power level adjustment amount associated with the channel spacing indication, wherein the adaptively determined transmission power level is equal to a predetermined function of the predetermined minimum transmission level and the power channel-spacing-dependent transmission power level.

9. The method of claim 8, wherein the predetermined function represents a maximum function.

10. The method of claim 1, wherein utilizing the second communications control circuit to determine the transmission power of the second communications control circuit at least according to whether the multiple conditions related to the first communications control circuit are met for controlling the respective transmission power levels of the multiple packets from the second communications control circuit to the second communications device in the per-packet manner further comprises:

in response to the first estimated remaining time indication among the at least one indication being in a valid range of the first estimated remaining time indication, for indicating the estimated time of the remaining window, the estimated time being the time remaining for the second communications control circuit, before the next receiving operation of the first communications control circuit, utilizing the second communications control circuit to adaptively determine a transmission power level of a first packet among the multiple packets according to a current packet duration of the first packet and the estimated time indicated by the first estimated remaining time indication; and utilizing the second communications control circuit to transmit the first packet with the adaptively determined transmission power level from the second communications control circuit to the second communications device.

11. The method of claim 10, wherein the second communications control circuit is arranged to determine whether the estimated time indicated by the first estimated remaining time indication is greater than the current packet duration of the first packet to generate a determination result, for selecting a predetermined transmission power level corresponding to the determination result from multiple predetermined transmission power levels to be the adaptively determined transmission power level.

12. A method for performing transmission and reception control of a wireless communications device, the wireless communications device comprising a first communications control circuit and a second communications control circuit, the first communications control circuit communicating with a first communications device in compliance with a first protocol to provide a first wireless communications service and the second communications control circuit communicating with a second communications device in compliance with a second protocol to provide a second wireless communications service, the method of claim 1, further comprising:

utilizing the first communications control circuit to determine at least one indication regarding the first communications control circuit, for being sent to the second communications control circuit;

utilizing the second communications control circuit to receive the at least one indication from the first communications control circuit, for indicating at least one behavior of the first communications control circuit;

utilizing the second communications control circuit to determine transmission power of the second communications control circuit at least according to whether multiple conditions related to the first communications control circuit are met, for controlling respective transmission power levels of multiple packets from the second communications control circuit to the second communications device in a per-packet manner, wherein the multiple conditions comprise at least one condition which is dependent on the at least one indication; and utilizing the first communications control circuit to determine a reception gain of the first communications control circuit according to respective behaviors of the first communications control circuit and the second communications control circuit, for preventing occurrence of any saturation of a first received signal that is received from the first communications device by the first communications control circuit, wherein the reception gain is dependent on the transmission power of the second communications control circuit.

13. The method of claim 12, further comprising:

determining whether a first time period of packet reception of the first communications control circuit and a second time period of packet transmission of the second communications control circuit will overlap each other;

wherein in response to it being determined that the first time period of the packet reception of the first communications control circuit and the second time period of the packet transmission of the second communications control circuit will overlap each other, the first communications control circuit is arranged to determine the reception gain of the first communications control circuit according to the respective behaviors of the first communications control circuit and the second communications control circuit, for preventing the occurrence of the any saturation of the first received signal that is received from the first communications device by the first communications control circuit.

14. The method of claim 12, further comprising:

determining a channel spacing indication, for indicating a channel spacing between a second wireless communications channel of the second communications control circuit and a first wireless communications channel of the first communications control circuit; and utilizing the first communications control circuit to determine a received signal strength of a second received signal that is previously received from the second communications control circuit by the first communications control circuit through at least one first antenna coupled to the first communications control circuit;

wherein the first communications control circuit is arranged to select a predetermined candidate reception gain from multiple predetermined candidate reception gains according to the received signal strength of the second received signal and the channel spacing indication to be the reception gain of the first communications control circuit.

15. The method of claim 14, wherein a predetermined mapping table within the wireless communications device is arranged to store multiple mapping relationships, for mapping multiple first values of a first dimension regarding the received signal strength and multiple second values of a second dimension regarding the channel spacing indication to the multiple predetermined candidate reception gains; and the first communications control circuit is arranged to refer to the predetermined mapping table to select the predetermined candidate reception gain from the multiple predetermined candidate reception gains according to the received signal strength of the second received signal and the channel spacing indication to be the reception gain of the first communications control circuit.

16. A wireless communications device, comprising:

a first communications control circuit, arranged to communicate with a first communications device in compliance with a first protocol to provide a first wireless communications service, wherein the first communications control circuit determines at least one indication regarding the first communications control circuit, for being sent to at least one other circuit within the wireless communications device; and a second communications control circuit, arranged to communicate with a second communications device in compliance with a second protocol to provide a second wireless communications service, wherein the second communications control circuit receives the at least one indication from the first communications control circuit, for indicating at least one behavior of the first communications control circuit;

wherein the second communications control circuit determines transmission power of the second communications control circuit at least according to whether multiple conditions related to the first communications control circuit are met, for controlling respective transmission power levels of multiple packets from the second communications control circuit to the second communications device in a per-packet manner, wherein the multiple conditions comprise at least one condition which is dependent on the at least one indication; and the at least one indication comprises a first estimated remaining time indication, for indicating estimated time of a remaining window, the estimated time being time remaining for the second communications control circuit, before a next receiving operation of the first communications control circuit, wherein the multiple conditions comprise a first condition which is dependent on the first estimated remaining time indication.

17. The wireless communications device of claim 16, further comprising:

at least one first antenna, coupled to the first communications control circuit, wherein the first communications control circuit is arranged to communicate with the first communications device through the at least one first antenna; and at least one second antenna, coupled to the second communications control circuit, wherein the second communications control circuit is arranged to communicate with the second communications device through the at least one second antenna.

18. The wireless communications device of claim 16, wherein the first communications control circuit is arranged to determine a reception gain of the first communications control circuit according to respective behaviors of the first communications control circuit and the second communications control circuit, for preventing occurrence of any saturation of a first received signal that is received from the first communications device by the first communications control circuit, wherein the reception gain is dependent on the transmission power of the second communications control circuit.

19. The wireless communications device of claim 18, wherein the wireless communications device is arranged to determine a channel spacing indication, for indicating a channel spacing between a second wireless communications channel of the second communications control circuit and a first wireless communications channel of the first communications control circuit; the first communications control circuit is arranged to determine a received signal strength of a second received signal that is previously received from the second communications control circuit by the first communications control circuit through at least one first antenna coupled to the first communications control circuit; and the first communications control circuit is arranged to select a predetermined candidate reception gain from multiple predetermined candidate reception gains according to the received signal strength of the second received signal and the channel spacing indication to be the reception gain of the first communications control circuit.

* * * * *